United States Patent [19]

Ogletree

[11] 4,404,156

[45] Sep. 13, 1983

[54] METHOD FOR MAKING CONTINUOUS FIBER REINFORCED CAST THERMOPLASTIC STRUCTURES

[76] Inventor: Ronald K. Ogletree, 392 Fairlane Dr., Spartanburg, S.C. 29302

[21] Appl. No.: 289,117

[22] Filed: Aug. 3, 1981

[51] Int. Cl.³ ............................ B29C 6/00; B29D 3/02
[52] U.S. Cl. ..................................... 264/162; 264/277
[58] Field of Search ............... 425/122, 111, 116, 117, 425/123; 264/257, 258, 231, 275, 277, 278, 162; 249/83, 85, 95, 96, 97

[56] References Cited

U.S. PATENT DOCUMENTS

| | | | |
|---|---|---|---|
| 1,601,911 | 10/1926 | Godfrey | 264/258 |
| 1,719,290 | 7/1929 | Danielson | 264/258 |
| 2,903,388 | 9/1959 | Jonke et al. | 264/258 |
| 2,964,442 | 12/1960 | Hansen | 264/231 |
| 3,009,578 | 11/1961 | Foote et al. | 425/111 |
| 3,023,475 | 3/1962 | Yerby et al. | 425/111 |
| 3,036,356 | 5/1962 | Greulich | 425/111 |
| 3,431,331 | 4/1969 | Pincus et al. | 425/116 |
| 3,439,087 | 4/1969 | Ledeen | 264/277 |
| 3,608,163 | 9/1971 | Harford | 425/111 |
| 4,029,453 | 6/1977 | Campion | 425/111 |
| 4,038,355 | 7/1977 | Bratchell | 425/111 |
| 4,161,817 | 7/1979 | Bernardo et al. | 264/275 |

FOREIGN PATENT DOCUMENTS

| | | | |
|---|---|---|---|
| 151075 | 4/1953 | Australia | 425/111 |
| 2734483 | 2/1979 | Fed. Rep. of Germany | 264/257 |
| 784184 | 10/1957 | United Kingdom | 425/111 |

*Primary Examiner*—Willard E. Hoag
*Attorney, Agent, or Firm*—Dority & Flint

[57] ABSTRACT

A fiber reinforced thermoplastic structure having multiple layers of individual reinforcing elements in sheet form 12 or as a single continuous strand 12a of continuous monofilaments, multi-filaments or spun yarns is disclosed. The layers extend in parallel planes wherein in each plane the individual elements may be in parallel or in non-parallel relation with an included angle of intersection, a, of 0 to 45 degrees as required by a specific application. The structure is manufactured by simultaneously assembling a segmented mold 20, 50 and selectively placing and fixing the location of individual reinforcing elements 12, 12a to give the resultant article described physical properties. The elements are encapsulated by a plastic resin which solidifies in the approximate shape and size of the segmented mold cavity.

12 Claims, 9 Drawing Figures

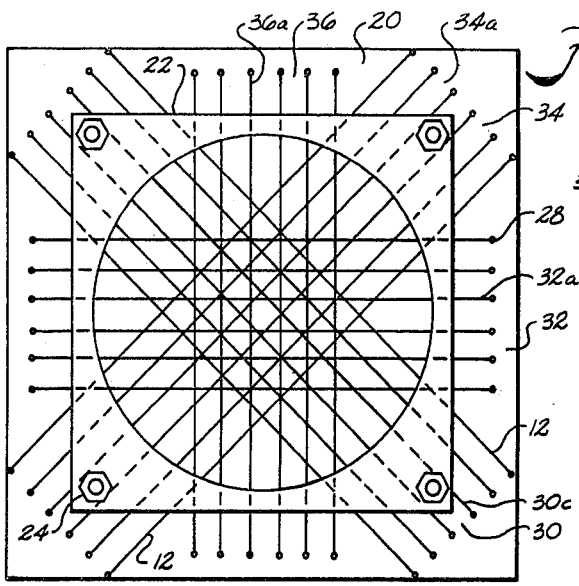
Fig. 3
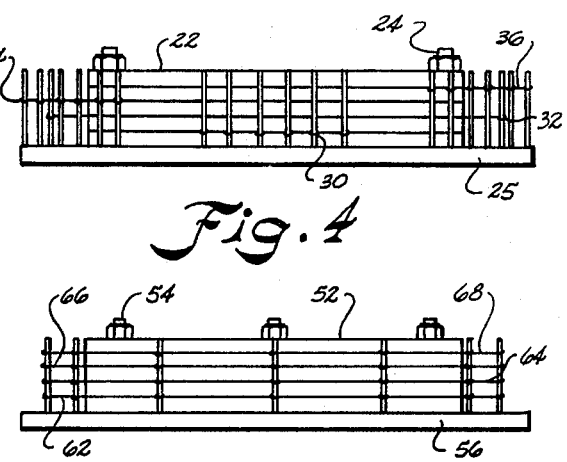
Fig. 4
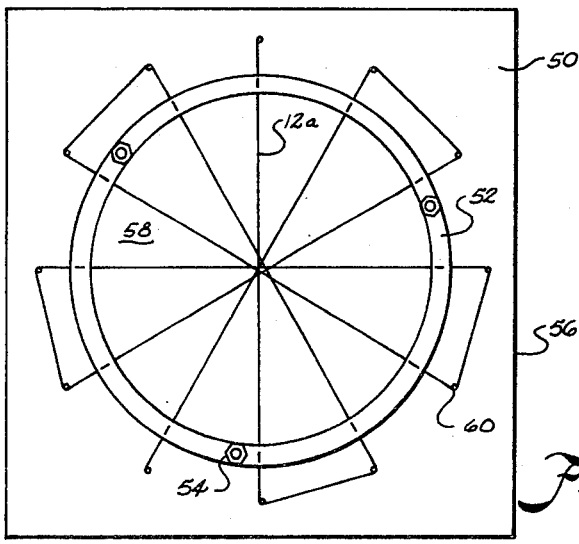
Fig. 5
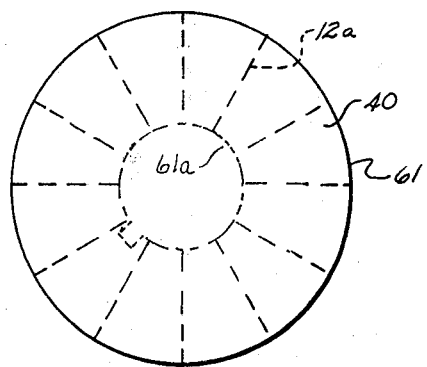
Fig. 6
Fig. 7
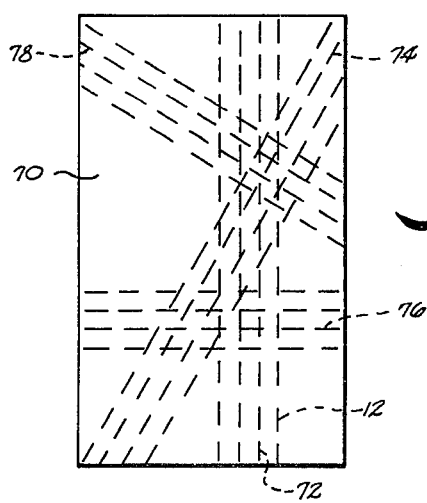
Fig. 9
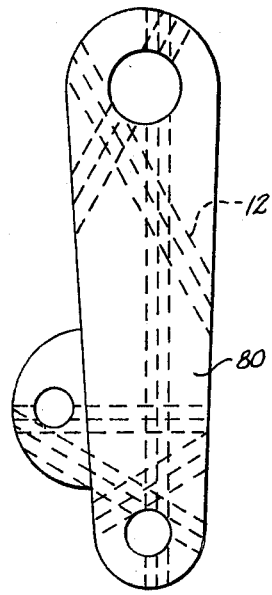
Fig. 8

METHOD FOR MAKING CONTINUOUS FIBER REINFORCED CAST THERMOPLASTIC STRUCTURES

BACKGROUND OF THE INVENTION

The invention relates to a method of reinforcing cast thermoplastic structures by utilizing continuous fiber reinforcing elements and the articles made thereby.

The use of discontinuous or chopped fibers in reinforcing thermoplastic resins for engineering applications has long been established. In general, the short fibers cost the least, and fabrication costs are lowest. However, the properties of the resulting composite are relatively low. The primary use of chopped fiber reinforced thermoplastic resins has been in the manufacture of injection molded parts which are typically relatively small and must be relatively thin in cross-section such as relatively small gears, bearings, bushings, thrust washers and the like small articles. Since thermoplastic resins typically are poor heat conductors, injection molds are often chilled to speed the solidification process. With relatively thick cross-section parts, cooling can result in rapid surface hardening while the center of the part is yet molten. Defects such as voids, sinks and distortion become inevitable under such conditions. Thus, injection molding with reinforcing fibers has been limited to articles with relatively thin cross-sections.

Extrusion of reinforced thermoplastic shapes is also possible although distribution of the reinforcing fibers throughout the thermoplastic resin is not complete and there is a practical limit to the size of extruded thermoplastic shapes.

The process of casting thermoplastic resins according to the present invention extends the size range of stock shapes or custom shapes of articles well beyond that possible with injection molding or extrusion and enables the manufacture of relatively thick cross-sectional shapes. However, previous attempts to reinforce cast thermoplastic materials with milled or chopped fibers has failed due to settling of the reinforcement fibers before the thermoplastic solidifies. Further, attempts to produce thermally or electrically cnductive cast thermoplastics by the addition of conductive reinforcements has also failed due to encapsulation of the chopped, discontinuous reinforcement material.

Continuous strands of reinforcement have been utilized for reinforcing thermosetting resins, however, such has usually been in fabric forms wherein strands are oriented in the weft and warp directions limiting flexibility in arranging of the lines of fiber reinforcement directionally in the structure. The elements in the weave pattern undulate which lessens the strength as compared to a straight element. U.S. Pat. No. 3,870,580 discloses a structure reinforced with woven reinforcing fibers.

The most common form of construction for reinforced thermosetting resins is the lay-up process where the fiber reinforcing elements are not anchored but set and held in place by the addition of the resin binder during lay-up. Reinforcement of thermosetting resinous structures has been limited generally to that of fabrics owing to the necessity of setting the reinforcing fabric in place by chemical binding.

SUMMARY OF THE INVENTION

The present invention is directed to a cast thermoplastic structure reinforced with continuous fiber elements and method of manufacture which is summarized in the following objects.

To provide a cast structure and article reinforced with continuous fiber elements and method of manufacture wherein the strength or conductivity of the individual fiber elements is selectively utilized to its greatest practical extent.

To provide a thermoplastic structure reinforced with continuous reinforcing elements or strands and method wherein the reinforcing elements may be selected and tailored in their orientation and amount to impart to the structure desired physical or electrical properties.

Another important object of the present invention is to provide a continuous fiber reinforced structure and method of manufacture for relatively large articles having thick cross-sections as compared to extruded or injection molded articles.

Yet another important object of the present invention is to provide a cast thermoplastic article reinforced with continuous fiber strands and method of manufacture wherein the selected location and relation of the individual reinforcing strands and/or sets of reinforcing strands is determined and fixed during assembly of a segmented casting mold and remains fixed during the subsequent casting of the plastic resin.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a plan view showing the assembled fiber reinforcing elements anchored within a mold and jig assembly prior to the casting of the resin, FIG. 4 is a side elevation illustrating the assembly of FIG. 3, FIG. 5 is a plan view illustrating a single continuous fiber reinforcing element anchored in a mold and jig assembly prior to the caseting of a resin, FIG. 6 is a side elevation illustrating the assembly of FIG. 5, FIG. 7 is a top plan view illustrating an article reinforced and cast in the assembly of FIGS. 5 and 6, after machining the central opening with some reinforcing elements shown in dotted lines, and FIGS. 8 and 9 are schematic plan views illustrating reinforced articles made according to the invention wherein some of the fiber reinforcing elements are shown by broken lines.

DESCRIPTION OF A PREFERRED EMBODIMENT

The invention relates to a cast thermoplastic structure or article having continuous fiber reinforcing elements located within the cast shape to provide desired physical or electrical properties.

Figure 1:
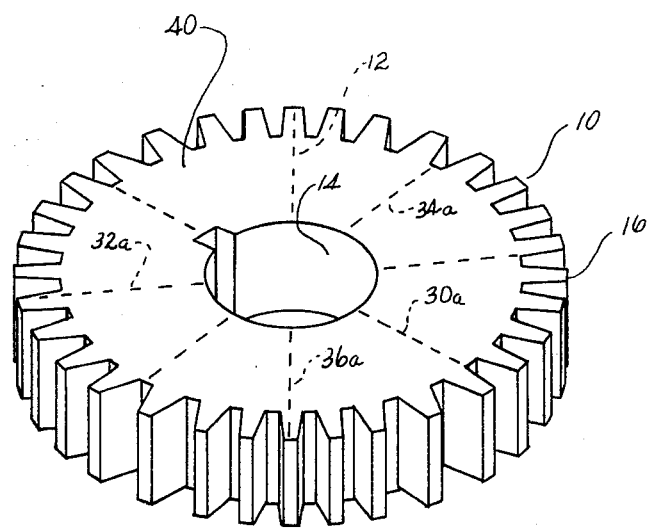
FIG. 1 is a perspective view illustrating a typical reinforced structure and method according to the invention with some of the fiber reinforcing strands shown by broken lines.
Figure 2:
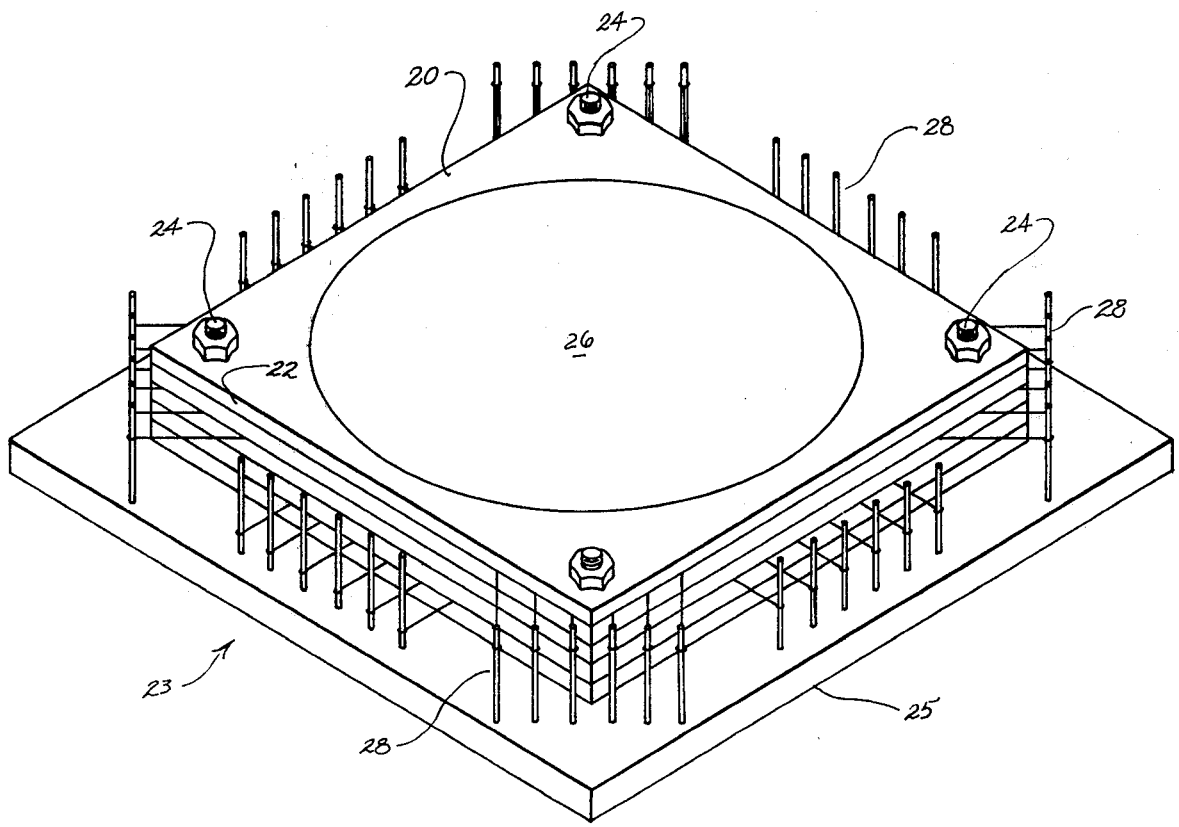
FIG. 2 is a perspective view illustrating a segmented mold which may be utilized in making an article in accordance with the method of the present invention.

Referring now in more detail to the drawings, a simplified embodiment of the invention is illustrated in FIG. 1 in the form of a cast gear element 10 reinforced with continuous fiber strands or elements 12.

The reinforcing elements are continuous monofilaments, multifilaments or spun yarns. The reinforcing fiber strands or yarns may be glass fibers, carbon fibers, aramid fibers, boron fibers, nylon fibers or other high strength plastic fibers or conductive fibers such as polytetrafluoroethylene fibers, or a combination thereof. Such yarns are preferred to have a tensile strength of at least 1000 psi and a stiffness of at least 5 grams per denier. The length of the reinforcing elements lies between that of the minimum dimension and maximum dimension of the cast shape.

Reinforcing strands 12 may be oriented in parallel (sheet form) or non-parallel relation in each layer. If non-parallel, the strands in a layer are preferably mutually oriented at an included angle, a, of 0 to 45 degrees. The elements of vertically spaced apart layers lie in generally horizontal planes in reference to the mold formation. Any combination of element orientation may be employed depending on the application being made. For example, the layers may alternate in having the elements therein parallel or non-parallel. The layers are preferably spaced from 0.001 to 1.0 inches apart throughout the cast shape depending on the application being made.

As illustrated, the layers may include a plurality of individual continuous strands 12 arranged in sheet form (FIG. 3), generally parallel or side-by-side, or a single continuous strand 12a (FIG. 5). When provided in sheet form, reinforcing elements of different adjacent layers are oriented at an included angle, a, of from 0 to 45 degrees with respect to each other.

The gear of FIG. 1 is illustrated as including four layers 30, 32, 34, and 36 each of which contains reinforcing elements 12 in sheet form. One element of each layer is shown in dotted lines in FIG. 1.

The article of FIG. 1 may be cast in a mold having a gear shape or may be formed as a flat cylindrical stock which in subsequent steps is drilled or cut out to form a central bore 14 and then the teeth 16 machined. The latter method is illustrated wherein a horizontal mold 20 (FIG. 3) is utilized which includes a plurality of mold segments 22 which are assembled by mechanical means in a jig assembly 23 to form a hollow cylindrical mold cavity 26.

The jig assembly includes means for assembling the mold segments 22 in a stacked configuration such as screw posts 24 over which the mold segments are fitted and clamped. The jig assembly includes pins 28 by which the strands are secured external of the mold cavity. Pins or clamp arrangements to anchor the yarn or yarn ends external of the mold may be arranged and provided in any suitable manner. It is to be understood one skilled in the art could design suitable jigs or mold assemblies to cast articles in accordance with the method of the present invention to suit commercial production and processing. The individual fiber reinforcing elements are selectively located and held in place within the mold cavity 26 by the segmented molds 22 as anchored by the aforementioned jig.

In the illustrated gear article 10, the four layers 30–36 of reinforcing strands 12 are in sheet form, and, for example, if gear 10 is one-half inch in thickness, then the layers 30–36 may be one-eighth of an inch apart.

The individual mold segments 22 and layers of fiber reinforcing elements 12 are assembled until the structural mold is complete. If desired, a suitable gasketing material may also be utilized between the mold segments 22 to minimize leakage of low viscosity plastic resins from the mold cavity 26. However, it is contemplated that the spacing between segments with fiber strands sandwiched therebetween would not require such since yarn diameters are on the order of 0.010 of a inch or less.

The assembled structural mold is then filled with a suitable thermoplastic resin 40 to encapsulate the individual fiber reinforcing elements 12. If desired, the mold may be placed under vacuum to assist in the complete filling of the mold cavity 26 or the fluid resin may be pressure injected into the mold. The plastic resin 40 is allowed to solidify through cooling or polymerization, or the like and the reinforced shape or structure is removed from the mold.

Suitable thermoplastic resins include polymeric materials such as nylon, polyurethane, polystyrene, acrylic, or their co-polymers which can be cast into custom or stock shapes in molds.

In FIGS. 5 and 6, a mold 50 is illustrated having a plurality of circular plate segments 52 which are secured and stacked upon one another over screw posts 54 carried by base 56. Segmented mold plates 52 form a mold cavity 58 when assembled having the same shape as mold cavity 26 but plates 52 and pins 60 are arranged circular to accommodate criss-crossing of a single continuous strand 12a in each layer. Alternately, a single continuous strand 12a may be wrapped in the desired reinforcing pattern about pins 60 continuously through all four layers.

Article 61 is illustrated having been removed from mold 50 with a bore 61a having been machined therein but without machining of teeth as yet. Some radial lines of reinforcement are shown in dotted lines.

A mold with multiple cavities may also be utilized as well as many other cavity configurations or arrangements.

According to the reinforcing pattern of FIGS. 5–7, layers 62, 64, 66 and 68 of reinforcing elements 12a are arranged in a radial pattern to reinforce the gear in the load bearing directions wherein the elements are arranged at an included angle of intersection, a, of 0 to 45 degrees relative to one another. The layers being illustrated as spaced approximately 0.125 inches apart.

In accordance with the major object of the present invention, the continuous reinforcing strands 12 or 12a may be arranged across the mold cavity and hence the cast article to give a desired reinforcing pattern and desired physical or electrical characteristic. It will be noted that elements 12 or 12a are straight as lying across the mold cavities and extend as such in the cast article for maximum strength. It has been found to be paricularly advantageous to have spaced layers of parallel elements 12 and non-parallel elements 12a wherein the non-parallel elements are oriented at an included angle, a, with respect to each other.

FIG. 8 illustrates, schematically, a reinforcing pattern for a plate article 70 reinforced with elements 12 in spaced layers 72–78 each being in sheet form. FIG. 9 is a schematic illustration of a reinforcement pattern for reinforcing a flap link 80 by arrangement of reinforcing elements 12 in a single layer.

While a preferred embodiment of the inveniton has been described using specific terms, such description is for illustrative purposes only, it is to be understood that changes and variations may be made without departing from the spirit or scope of the following claims.

What is claimed is:

1. A method for making a reinforced cast thermoplastic structure comprising: in a mold having a base member and a cavity of a desired shape, plural pins being disposed about said mold and projecting from said base member and perpendicular thereto;
   selectively arranging continuous fiber reinforcing elements extending across said cavity to form a plurality of spaced fiber layers, securing said elements to said pins at a plurality of elevations corresponding to said spaced fiber layers;
   adding a thermoplastic polymeric material to said mold in fluid form; and solidifying said material in said shape generally without deformation or change in arrangement of said reinforcing fibers in said mold cavity.

2. The method of claim 1 including a plurality of generally parallel continuous fiber reinforcing elements extending across said mold cavity wherein fiber elements lying in one said plane are at an included angle of intersection relative to said elements in another of said planes of from 0 to 45 degrees.

3. The method of claim 1 including removing said solidified material and machining said material to the form of a desired article.

4. The method of claim 1 including:
   a single continuous fiber element arranged across said mold cavity crossed upon itself in a predetermined criss-cross pattern.

5. The method of claim 4 wherein the included angle of intersection of said continuous fiber element crossed upon itself is from 0 to 45 degrees.

6. The method of claim 1 wherein said reinforcing elements in a number of said layers are parallel to one another.

7. The method of claim 6 wherein a number of said layers include reinforcing elements intersecting one another at included angles of from 0 to 45 degrees.

8. The method defined in claim 7 wherein said reinforcing elements are thermally conductive.

9. The method defined in claim 7 wherein said reinforcing elements are electrically conductive.

10. a method of making a high strength-to-weight fiber reinforced plastic structure comprising the steps of: assembling plural mold layers on a base member to form a structural mold
    having a hollow mold cavity and a predetermined shape;
    selectively arranging continuous fiber reinforcing elements extending generally in plural parallel planes and between adjacent said layers across said mold cavity;
    providing rigid mechanical anchor means on said base member external of said mold cavity and transversely of said layers for anchoring and affixing plural layers of said fiber reinforcing elements against movement and deformation in said selected arrangement during molding;
    securing said reinforcing elements in said planes to said mechanical anchor means external of said mold cavity at plural elevations above said base member;
    alternately assembling individual mold layers and layers of said continuous fiber reinforcing elements until the structural mold is complete providing a plurality of spaced apart generally parallel layers of said reinforcing elements;
    said fiber reinforcing elements having an angle of intersection with respect to elements of adjacent layers;
    encapsulating all said reinforcing elements in an initially fluid thermoplastic resin;
    solidifying said resin to form said structure; and
    removing the said reinforced structure form the structural mold.

11. The method defined in claim 9 wherein said step of selectively arrranging reinforcing elements comprises:
    selectively arranging sheets of parallel continuous fiber reinforcing elements extending in said planes, where said angle of intersection of said parallel elements lies between 0 and 45 degrees with respect to said elements.

12. The method of claim 10, said anchor means being rigid fixtures carried externally of said mold cavity by said base and fixedly securing said continuous fiber elements in arrangement across said mold cavity.

* * * * *